(12) United States Patent
Carpenter et al.

(10) Patent No.: US 8,347,215 B2
(45) Date of Patent: *Jan. 1, 2013

(54) SIMULTANEOUS INPUT ACROSS MULTIPLE APPLICATIONS

(75) Inventors: Curt Carpenter, Redmond, WA (US); Debora Everett, Sultan, WA (US); Doug Kramer, Bothell, WA (US); Derek E Sunday, Renton, WA (US); Chris Whytock, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 284 days.

This patent is subject to a terminal disclaimer.

(21) Appl. No.: 12/616,667

(22) Filed: Nov. 11, 2009

(65) Prior Publication Data

US 2010/0053110 A1    Mar. 4, 2010

Related U.S. Application Data

(63) Continuation of application No. 11/384,510, filed on Mar. 21, 2006, now Pat. No. 7,620,901.

(51) Int. Cl.
  *G06F 3/00* (2006.01)
  *G06F 3/048* (2006.01)
(52) U.S. Cl. ......... 715/754; 715/757; 715/758; 715/782
(58) Field of Classification Search .................. 715/702, 715/750–752, 754, 778, 864
See application file for complete search history.

(56) References Cited

U.S. PATENT DOCUMENTS

| | | | |
|---|---|---|---|
| 4,975,690 A | 12/1990 | Torres | |
| 5,107,443 A | 4/1992 | Smith et al. | |
| 5,363,507 A | 11/1994 | Nakayama | |
| 6,047,314 A | 4/2000 | Pommier et al. | |
| 6,241,612 B1 * | 6/2001 | Heredia | 463/42 |
| 6,951,516 B1 * | 10/2005 | Eguchi et al. | 463/40 |
| 7,278,107 B2 | 10/2007 | Price | |
| 7,326,117 B1 * | 2/2008 | Best | 463/32 |
| 2004/0139156 A1 | 7/2004 | Matthews et al. | |
| 2005/0162402 A1 * | 7/2005 | Watanachote | 345/173 |
| 2006/0287865 A1 | 12/2006 | Cross et al. | |

OTHER PUBLICATIONS

Office Action dated Jun. 12, 2008 cited in U.S. Appl. No. 11/384,510.
Office Action dated Jan. 8, 2009 cited in U.S. Appl. No. 11/384,510.
Notice of Allowance dated Jul. 23, 2009 cited in U.S. Appl. No. 12/384,510.

\* cited by examiner

*Primary Examiner* — Weilun Lo
*Assistant Examiner* — Truc Chuong
(74) *Attorney, Agent, or Firm* — Workman Nydegger

(57) ABSTRACT

One or more users may interact simultaneously with different applications on the same device through an input system such as a touch-sensitive display screen. Simultaneous user input may be detected by a multiple input system and subsequently transmitted to an application using a single transmission frame. An application corresponding to the user input is determined based on an input location of the user input and a location and size of a corresponding application. Simultaneous user inputs are rendered simultaneously by each corresponding application. Each application may further include a secondary event processing thread that runs in parallel to traditional operating system event threads. The secondary event processing thread bypasses sequential processing limits of an operating system event thread, providing substantially simultaneous processing of input.

20 Claims, 7 Drawing Sheets

SIMULTANEOUS INPUT ACROSS MULTIPLE APPLICATIONS

CROSS-REFERENCE TO RELATED APPLICATIONS

This application is a continuation of prior application Ser. No. 11/384,510 filed Mar. 21, 2006, titled "Simultaneous Input Across Multiple Application", now U.S. Pat. No. 7,620,901 issued on Nov. 17, 2009, which is incorporated herein by reference in its entirety.

BACKGROUND

Background and Relevant Art

Interaction with computing devices has changed significantly since the inception of the graphical user interface. Users may control a variety of functions and interact with numerous types of applications through a graphical user interface using one or more associated hardware input devices. For example, computing devices are often used for gaming and allow multiple users to play the same game at the same time. Various input devices include joysticks, touch-sensitive screens, keyboards, mice and the like. Users may open several different applications at the same time and multi-task by switching between applications and viewing multiple documents simultaneously. Input events are determined and rendered based on a currently focused application of the user interface and the type of user input. Thus, in one situation, the pressing of keys on a keyboard may correspond to entering text when a word processing application is active (i.e., has input focus).

However, current computing systems require a user to alter the focus of the user interface in order to enter input into a different application. Without changing the focus, user input is directed to and registered on the same application. Multiple users wishing to interact with different applications would need to take turns and switch between the two applications for their input to register correctly. Users wanting to use two applications simultaneously are unable to do so due to this limitation. As such, users wishing to share a computing device must typically agree on a single application with which to interact. Accordingly, the efficiency of using a single device is tremendously decreased.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Aspects are directed to a method and system for handling and processing multiple user inputs across multiple applications. In particular, aspects allow for multiple users to interact with multiple applications simultaneously. Additionally, multiple users may further interact with components of the same application simultaneously. Simultaneous input is detected by a multiple input hardware system and sent in a single transmission frame to one or more applications corresponding to the input. Application to input correspondence is determined based on an input location of each input and a location and size of each application on the user interface. Input may further be routed based on a number of other factors including input type and subscription information. In one example, an application may subscribe to a particular input type or input source and thus, upon detecting of the designated input type or input source, the input is sent to the subscribing application. Input may also be routed based on matching or corresponding characteristics of the input and the applications. The user input may be routed by the hardware system and/or a third-party routing system or component. Received user input may also be forwarded to each of the applications of a user interface, allowing each of the applications to determine relevant or associated input from the received input.

In another aspect, each of the multiple applications includes a secondary event processing thread running in parallel to a main event processing thread of an underlying operating system. Upon receiving user input from a multiple input hardware system or, alternatively, a single user input device, the secondary event processing thread determines an input event from the input and sends the event to the application user interface. Since each application has a secondary event processing thread, multiple applications are capable of handling multiple inputs received at the same time and directed to different applications. The operating system event thread is, in effect, bypassed by using the secondary event thread. Accordingly, a user need not alter the focus of the user interface in order for his or her user input to be directed to a particular application. In one or more configurations, user input received at a secondary processing thread may be synchronized with one or more events of the operating system's event processing thread. Thus, user input received from a traditional single input device and input received from a multiple input device may be processed simultaneously by a single application or across multiple applications.

BRIEF DESCRIPTION OF THE DRAWINGS

The present disclosure is illustrated by way of example and not by limitation in the accompanying figures in which like reference numerals indicate similar elements and in which.

DETAILED DESCRIPTION

In the following description, reference is made to the accompanying drawings, which form a part hereof, and in which is shown by way of illustration various embodiments. It is to be understood that other embodiments may be utilized and structural and functional modifications may be made without departing from the scope of the present disclosure.

Figure 1:
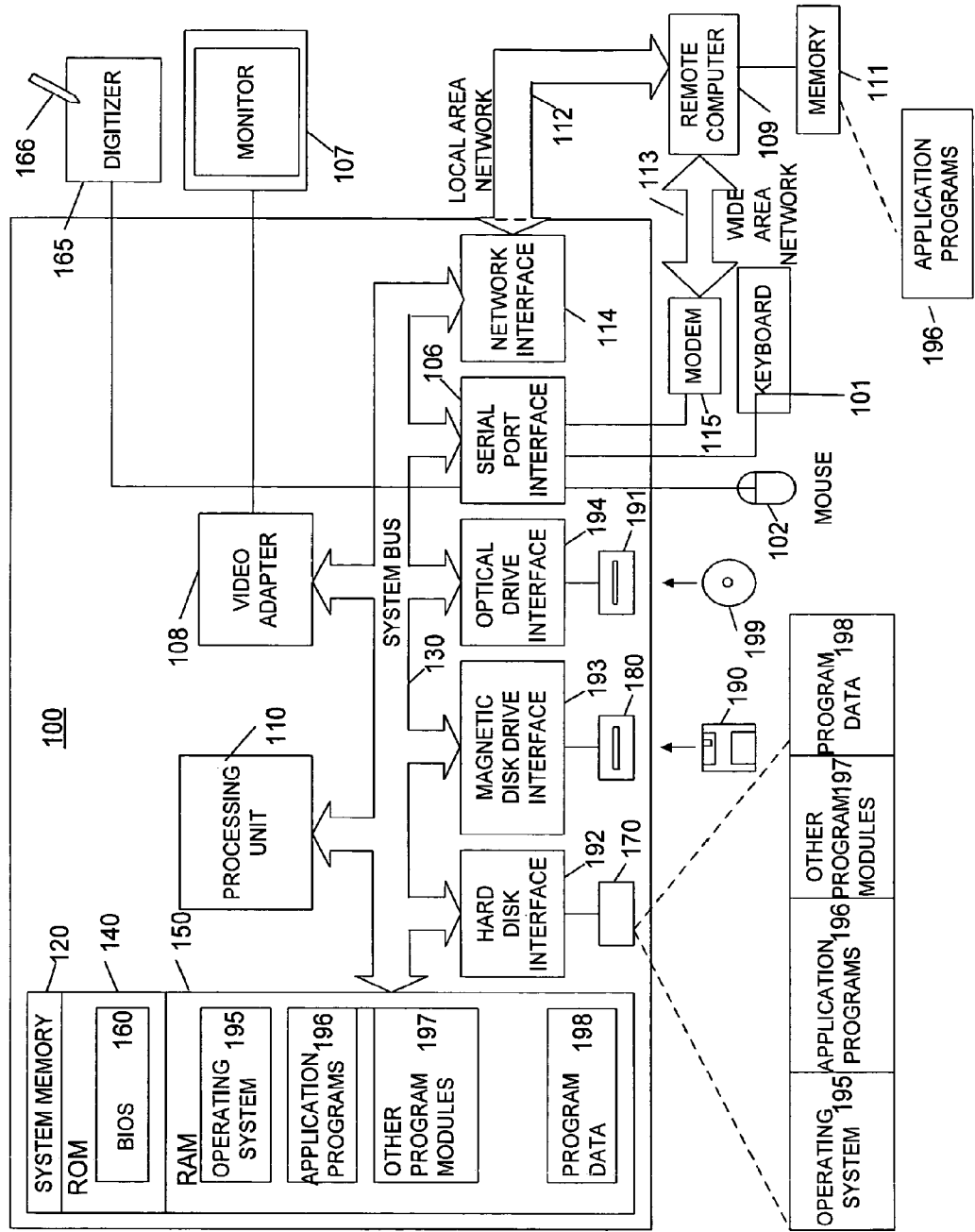
FIG. 1 illustrates a schematic diagram of a general-purpose digital computing environment that can be used to implement various aspects of the present disclosure.

FIG. 1 illustrates a schematic diagram of a general-purpose digital computing environment. In FIG. 1, a computer 100 includes a processing unit 110, a system memory 120, and a system bus 130 that couples various system components including the system memory 120 to the processing unit 110. The system bus 130 may be any of several types of bus structures including a memory bus or memory controller, a peripheral bus, and a local bus using any of a variety of bus architectures. The system memory 120 may include read only memory (ROM) 140 and random access memory (RAM) 150.

A basic input/output system 160 (BIOS), which contains the basic routines that help to transfer information between elements within the computer 100, is stored in the ROM 140. The computer 100 also may include a hard disk drive 170 for reading from and writing to a hard disk (not shown), a magnetic disk drive 180 for reading from or writing to a removable magnetic disk 190, and an optical disk drive 191 for reading from or writing to a removable optical disk 199, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. These drives and their associated computer-readable media provide nonvolatile storage of computer-readable instructions, data structures, program modules, and other data for the personal computer 100. It will be appreciated by those skilled in the art that other types of computer-readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 199, ROM 140, or RAM 150, including an operating system 195, one or more application programs 196, other program modules 197, and program data 198. A user can enter commands and information into the computer 100 through input devices, such as a keyboard 101 and pointing device 102 (such as a mouse). Other input devices (not shown) may include a microphone, joystick, game pad, satellite dish, scanner, or the like. These and other input devices often are connected to the processing unit 110 through a serial port interface 106 that is coupled to the system bus 130, but they also may be connected by other interfaces, such as a parallel port, game port, or a universal serial bus (USB), and the like. Further still, these devices may be coupled directly to the system bus 130 via an appropriate interface (not shown).

A monitor 107 or other type of display device also may be connected to the system bus 130 via an interface, such as a video adapter 108. In addition to the monitor 107, personal computers typically include other peripheral output devices (not shown), such as speakers and printers. In some example environments, a stylus digitizer 165 and accompanying stylus 166 are provided in order to digitally capture freehand input. Although a connection between the digitizer 165 and the serial port interface 106 is shown in FIG. 1, in practice, the digitizer 165 may be directly coupled to the processing unit 110, or it may be coupled to the processing unit 110 in any suitable manner, such as via a parallel port or another interface and the system bus 130 as is known in the art. Furthermore, although the digitizer 165 is shown apart from the monitor 107 in FIG. 1, the usable input area of the digitizer 165 may be co-extensive with the display area of the monitor 107. Further still, the digitizer 165 may be integrated in the monitor 107, or it may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and it typically includes many or all of the elements described above relative to the computer 100, although for simplicity, only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet, using both wired and wireless connections.

When used in a LAN networking environment, the computer 100 is connected to the local area network 112 through a network interface or adapter 114. When used in a WAN networking environment, the computer 100 typically includes a modem 115 or other means for establishing a communications link over the wide area network 113, such as the Internet. The modem 115, which may be internal or external to the computer 100, may be connected to the system bus 130 via the serial port interface 106. In a networked environment, program modules depicted relative to the personal computer 100, or portions thereof, may be stored in the remote memory storage device.

It will be appreciated that the network connections shown are examples, and other techniques for establishing a communications link between computers can be used. The existence of any of various well-known protocols such as TCP/IP, Ethernet, FTP, HTTP, UDP, and the like is presumed, and the computer 100 can be operated in a user-server configuration to permit a user to retrieve web pages from a web-based server. Any of various conventional web browsers can be used to display and manipulate data on web pages.

Although the FIG. 1 environment shows one example environment, it will be understood that other computing environments also may be used. For example, an environment may be used having fewer than all of the various aspects shown in FIG. 1 and described above, and these aspects may appear in various combinations and subcombinations that will be apparent to one of ordinary skill. Additional elements, devices or subsystems also may be included in or coupled to the computer 100.

Figure 2:
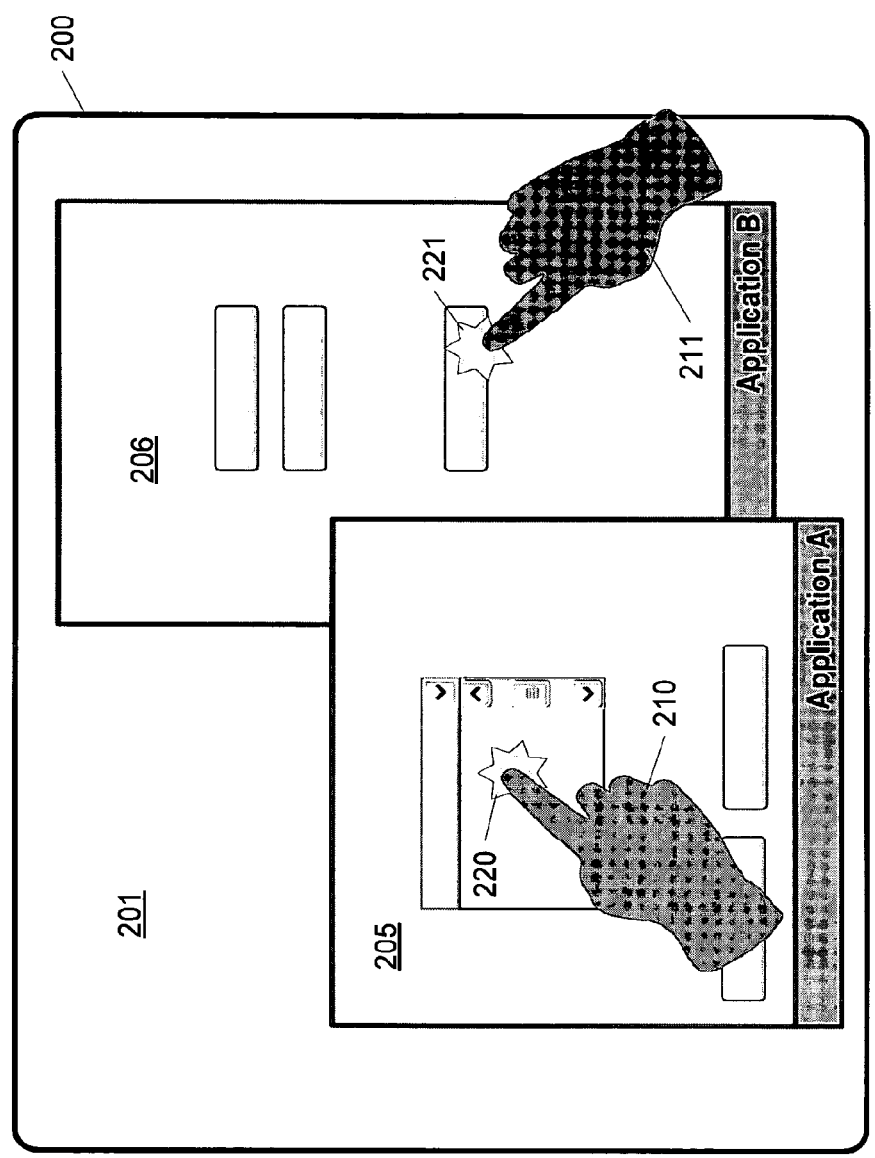
FIG. 2 is a diagram of interaction by multiple users with user interfaces of multiple applications using a single input device according to one or more aspects described herein.

FIG. 2 illustrates a touch-sensitive input system for receiving multiple simultaneous user inputs intended for different applications. The system includes a multiple input hardware system such as touch-sensitive screen 200 (e.g., combination of screen 107 and digitizer 165) displaying a user interface 201 and applications 205 and 206. User interface 201 further includes a plurality of graphical interface elements including interfaces associated with application A 205 and application B 206. Traditionally, a user must first choose an application with which to interact before entering input. Upon receiving the selection, user interface 201 and/or the underlying operating system or application routes all subsequently received user input to the selected application. Using one or more aspects described herein, however, multiple users may simultaneously interact with multiple applications without having to initially choose an application with which to interact. In other words, users of the same device may interact with different applications independently of and simultaneously with one another. This allows multiple users to work with multiple different applications using a single shared computing device.

In one example, user 210 may play an electronic memory card game at the same time user 211 is engaging in a game of minesweeper. Specifically, user 210 contacts one area of display 200 corresponding to the memory game application simultaneously with user 211 touching a different location of display 200 associated with the minesweeper game. The user inputs from both user 210 and user 211 are delivered simultaneously to each application. Significantly, neither user 210 nor user 211 needs to change input focus from the memory game application to the minesweeper application or vice versa in order for input from each user to register with their respective application. Since some computing devices process input and data sequentially, true simultaneity might not be achieved. As such, the term simultaneous is used herein to refer to a difference in time that is virtually imperceptible to one or more users of a computing device. Thus, a first input and a second input delivered to an application or rendered on an application user interface simultaneously may be delivered sequentially in such a way that the user perceives the delivery or rendering as simultaneous.

As previously mentioned, the system of FIG. 2 uses a multiple input capable hardware system such as touch-sensitive input display 200 rather than traditional single input hardware devices like current joysticks and mice. Multiple input hardware, as used herein, refers to devices which are capable of detecting and transmitting simultaneous user inputs at the same time. For example, a touch sensitive display device may detect simultaneous inputs by one or more users by capturing an image of user inputs (i.e., capture the image of light reflecting off of multiple touch contacts on the surface) and parsing the image to determine input information. Input devices transmit detected input signals to a destination device or application in periodic transmission intervals or frames. With traditional single input hardware devices, multiple simultaneous inputs are sent to an application in sequential transmission frames. Thus, input resulting from two users simultaneously pressing two buttons of a single input keyboard is detected and transmitted to an associated computing device in two sequential transmission slots. This results in a perceptible lag between the processing of the first user input and the processing of the second user input on user interface 201. Using a multiple input hardware system, however, two user inputs received simultaneously are transmitted in a single transmission frame to the computing device. As a result, simultaneous input received through the multiple input hardware can be rendered simultaneously through user interface 201 instead of in a perceptibly sequential order. For example, using a multiple input hardware device such as touch sensitive display 200, user 210 may enter numbers into a calculator application displayed on interface 201 at the same time a user 211 is navigating through web pages on a second application. The input corresponding to the entry of numbers in the calculator may be sent in the same transmission frame as the browsing input from user 211.

The correspondence between a user input and a particular application may be determined based on a user input location and an application location and size. User interface 201 or an underlying operating system may determine whether touch input from user 210 is directed to application 205 or application 206 based on the input location and the locations and sizes of applications 205 and 206. In one or more configurations, a table containing application locations and sizes may be stored. In response to detecting user input at location 220, a correspondence may be established between the input and application 205 using the application location table. Similarly, if a user touches location 221 on interface 201, the touch input may be routed or sent to application 206 based on the aforementioned determination techniques. Alternatively or additionally, input routing may be based on other heuristics including the type of input. For example, one application may receive all inputs that are recognized as finger input and another application may receive the input if the input is determined to originate from a stylus. Inputs may also be delivered to all applications in cases where either the input applies to all applications or where it is not possible to determine which application is interested in the input. In one example, a special gesture may correspond to a "hide all applications" command. In another example, a user may roll dice on an input device. Since the user may not be able to entirely control where the dice lands, the dice input may be transmitted to all applications.

Figure 3:
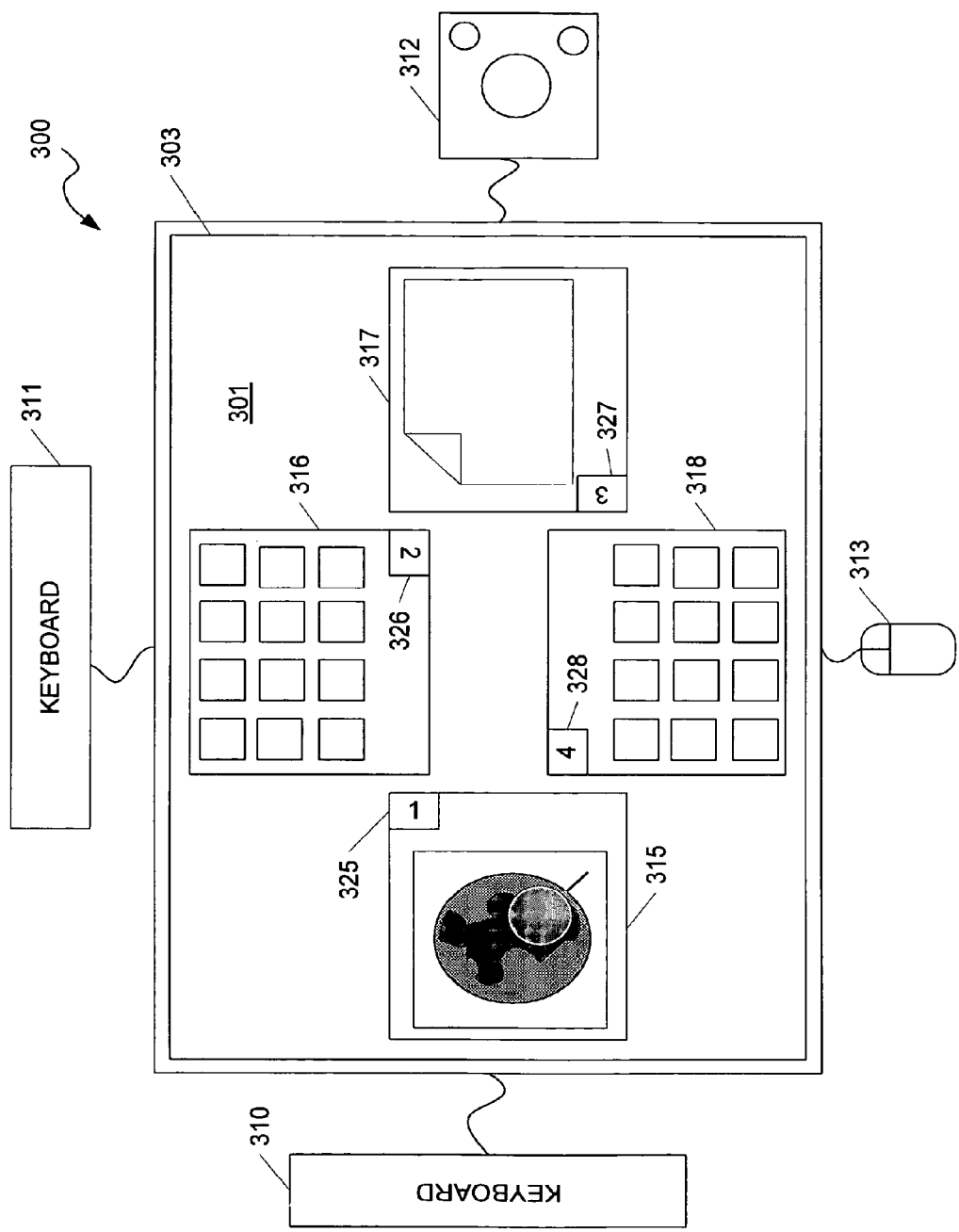
FIG. 3 is a diagram of user interaction with one or more applications using multiple input devices according to one or more aspects described herein.

FIG. 3 illustrates various aspects of a system 300 for processing multiple inputs across multiple applications. System 300 includes a computing device (e.g., computer 100) having a touch-sensitive display screen 303 (e.g., combination of screen 107 and digitizer 165) oriented such that touch-sensitive display 303 may be used as the surface of a table or workspace. Users may be seated around the display screen 303 of computing device and simultaneously interact with applications 315, 316, 317 and 318 by contacting corresponding locations or portions of touch-sensitive display screen 303. For example, a user may play a memory card game 318 by touching a first portion of screen 303 while one or more users are drafting a document on word processing application 317, playing a second memory card game 316 and/or drawing a picture in paint application 315 by contacting a second, third and/or fourth portion of screen 303. The user inputs may be differentiated and routed to the appropriate application based on the location of user input and the locations and sizes of the relevant applications. Input routing may be performed via a variety of other mechanisms as well.

In one or more configurations, two applications may be linked such that input between the two or more applications is synchronized. In other words, user input to application 318 may be synchronized and registered with application 316 and vice versa. Synchronization may include determining a time of receipt for each user input and sequencing the order in accordance with the determined receipt times. In one example, two users playing a competitive memory card game may simultaneously interact with two separate application instances, such as applications 316 and 318, of the memory game application. The game may display the same field of cards for both application instances 316 and 318 and each application instance 316 and 318 may register input from both players. Thus, simultaneous card selections from the players may be registered simultaneously on both applications 316 and 318. The synchronization of the user inputs ensures that a single card selection is not registered with both players. For example, once a pair of cards has been eliminated by a first player, the eliminated pair of cards is removed from both application instances 316 and 318 so that a second user cannot select that pair of cards. Additionally, input corresponding to flipping a card on application 315 may be simultaneously registered on application 318 (i.e., the input event associated with the card flipping is processed by application 318 as well).

Alternatively or additionally, the synchronization of application instances 316 and 318 may be coordinated by a third application (not shown). Each application may then communicate their inputs (i.e., selected cards) back to the third application. In one example, the use of a coordinating third application provides for a situation where two or more players attempted to claim the same matched cards at the same time. In such a situation, the third application may determine the winner of the matched cards based on which player obtained the next match.

In yet another example, four users of system 300 may simultaneously play a scrabble board game generated by interface 301. Each user may be assigned a block holder application that displays each user's scrabble blocks. Another application may be generated for displaying the scrabble board on which the blocks are to be placed. Users may place blocks on the scrabble board by initially touching a location on display 303 corresponding to the location of a particular scrabble block in the block holder application and subsequently touching a location of display 303 corresponding to a desired placement location in the scrabble board application. Simultaneously, other users may be rearranging their blocks by selecting a block and subsequently choosing a desired placement location in their block holder. Again, users are not required to wait for other users to finish entering input before entering their own input. The multiple inputs from the users are differentiated and routed based on the users' input location. Other techniques may also be used to route the user's input including routing input based on a unique characteristic of the user's input. For example, a user may use his or her finger to provide touch input. Accordingly, the user's input may be routed based on an identification of the user's fingerprint.

System 300 may further include input devices such as devices 310, 311, 312 and 313. In addition to touch-sensitive displays, input devices 310, 311, 312 and 313 may include a variety of device types such as joysticks, mice, keyboards and the like. Input devices 310, 311, 312 and 313 may further be of the same type or of different types depending on the applications with which the devices are associated. For example, in an electronic video game environment, each application interface 315, 316, 317 and 318 may be similar and require the users to use the same type of device, e.g., a joystick. However, if multiple users are working with different applications, the device types may differ. These input devices may act as supplemental input sources to touch-sensitive display 303 or, alternatively, function as the primary input device.

Each of input devices 310, 311, 312 and 313 may further be associated with one of applications 315, 316, 317 or 318. The associations may be chosen based on a user selection, input device type or a host of other factors. Indicators 325, 326, 327 and 328 are generated and displayed to allow multiple users to recognize and identify which applications correspond to which input devices. For example, indicators 325, 326, 327 and 328 may display a number that corresponds to a port on the computing device. The input devices, themselves, may also include an indicator such as an indicator light that identifies the device-application association. The input device-application association may be modified in a variety of ways including changing the settings in a control panel (not shown) and/or altering settings on the input device hardware.

Figure 4:
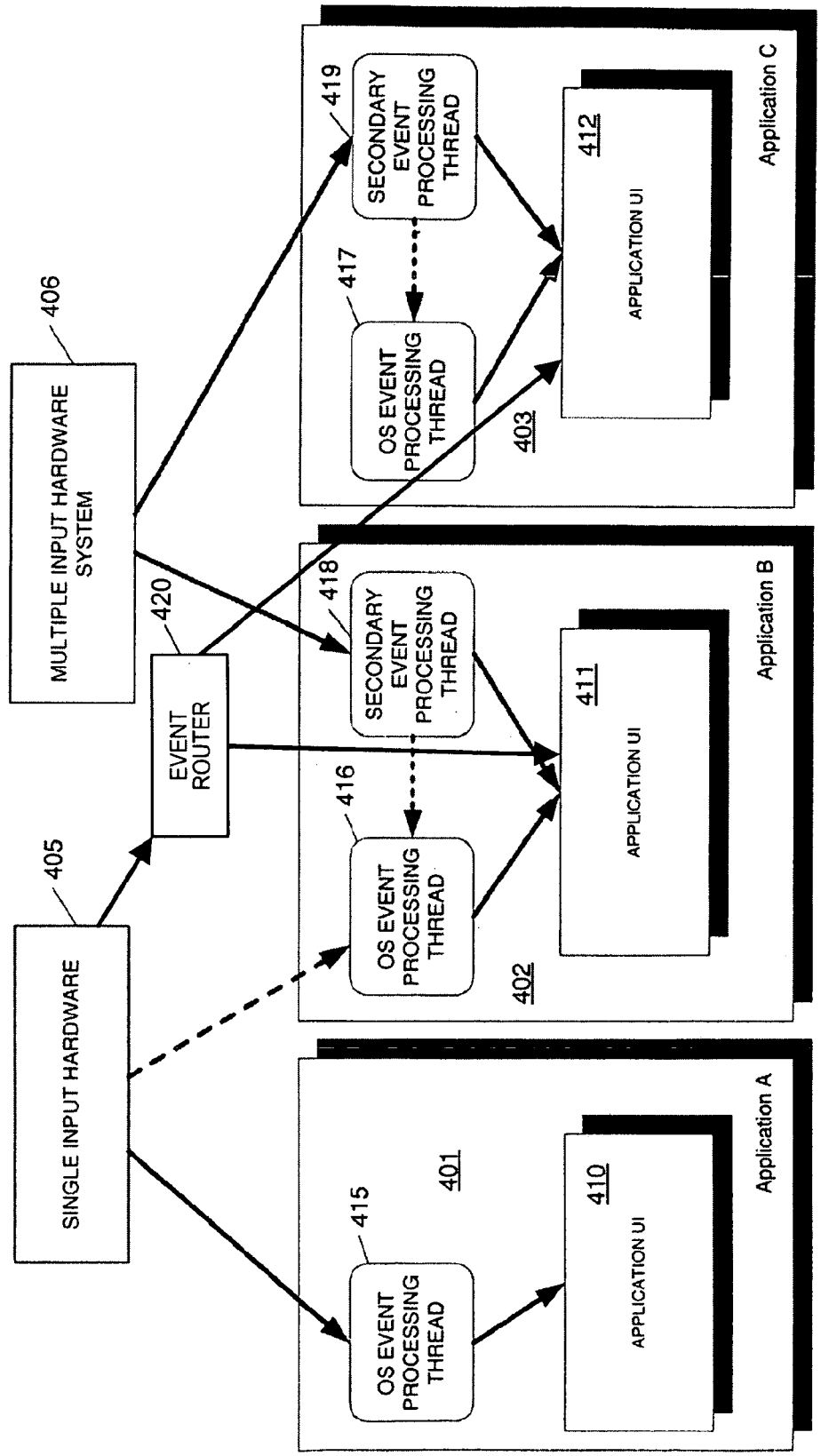
FIG. 4 is a block diagram of a multiple input aware application system according to one or more aspects described herein.

FIG. 4 is a block diagram illustrating a system for processing input from single input 405 and multiple input 406 hardware sources across a series of applications 401, 402 and 403. Single input devices differ from multiple input devices in that single input devices transmit simultaneous input sequentially while multiple input devices may transmit simultaneous input simultaneously in the same transmission frame. In addition, input from single input devices are processed by an operating system (OS) event thread 415, 416 or 417 depending on which application currently has focus. OS Event processing threads 415, 416 and 417 are limited to sequentially processing input events for a single application at a time. Thus, OS Event processing threads 415, 416 and 417 are incapable of processing input corresponding to users contacting multiple locations of a touch-sensitive display at the same time. Applications A 401, B 402 and C 403 each correspond to an OS Event processing thread 415, 416 and 417 and an application user interface (UI) 410, 411 and 412, respectively. In this example, applications B 402 and C 403 further include secondary event processing threads 418 and 419, respectively, in order to bypass the limits of OS Event processing threads 415, 416 and 417 and in order to process simultaneous input received from multiple input hardware system 406. Secondary event processing threads 418 and 419, unlike OS Event threads 415, 416 and 417, are not focus oriented and may thus process multiple simultaneous input received from a multiple input device such as system 406.

In applications B 402 and C 403, secondary event processing threads 418 and 419 operate in parallel to OS Event processing threads 416 and 417. Each input signal detected in the multiple input hardware system 406 is initially evaluated to determine a corresponding or receiving application. Application correspondence of each input signal may be determined based on a location of input and/or any one of a plurality of other factors. Thus, a first user input at a first location of a touch-sensitive display may be associated with and routed to a different application than a second user input received at a second location of the same touch-sensitive display. Input location and application location and size may be matched in order to determine appropriate correspondencies. Each user input may then be processed by either secondary event thread 418 or 419 depending on the determined application correspondency of each input.

In one or more instances, the multiple input hardware system 406 may include several types of input devices and each type of input may further be associated with a different application. Accordingly, the input signals may be routed based on, at least in part, the type of input. Accordingly, each secondary processing thread 418 and 419 may receive a plurality of input signals detected by the input hardware system 406 and perform parsing functions to determine which signals are relevant to their underlying application. Event routing may further be performed by a third party router component that is implemented between multiple input hardware system 406 and applications 402 and 403. Additionally, each secondary processing thread 418 and 419 may further be responsible for determining input events corresponding to the received input signals associated with their application, i.e., A 402 and B 403. Other processing steps may be implemented separately or in combination to properly render the input signals and/or changes on application UIs 411 and 412. In one or more configurations, multiple input hardware system 406 might not provide input or event routing.

Alternatively or additionally, a single input hardware device 405 may be used in combination with the multiple input hardware system 406 and multiple input aware applications 411 and 412. To facilitate such an implementation, an event router 420 may be added between the hardware 405 and multiple input aware applications 411 and 412. The event router 420 receives input events, generated by the OS, from single input hardware device 405 and determines an application to which the input event should be sent. The determination may be based on a subscription design pattern whereby multiple input applications 411 and 412 submit requests for input from the event router 420. The subscription requests may identify a particular area of the display screen that corresponds to the requesting application, a corresponding input type or the like. The event router 420, in response to the input requests, sends the appropriate input events to the requesting application. Thus, in one example, a user may play a video game on a computing device using a joystick input device while another user performs word processing tasks using a keyboard input device simultaneously on the same computing device.

In one or more configurations, secondary event processing threads 418 and 419, upon determining an input event from one or more received input signals, may send the input event to Application OS Event processing threads 416 and 417, respectively, for synchronization. In particular, the input events determined by the secondary threads 418 and 419 may be synchronized to one or more events currently in OS Event threads 416 and 417, respectively. Synchronization ensures that events are properly rendered on an application user interface by determining a sequence of events based on a receiving time of the user input. For example, a computing device may be connected to both a multiple input hardware system such as system 406 as well as a single input device such as hardware 405. Events detected and determined from both single input hardware 405 and multiple input system 406 may then be synchronized by, e.g., ordering the input events according to received time and ensuring appropriate rendering on a user interface of application 411.

Figure 5:
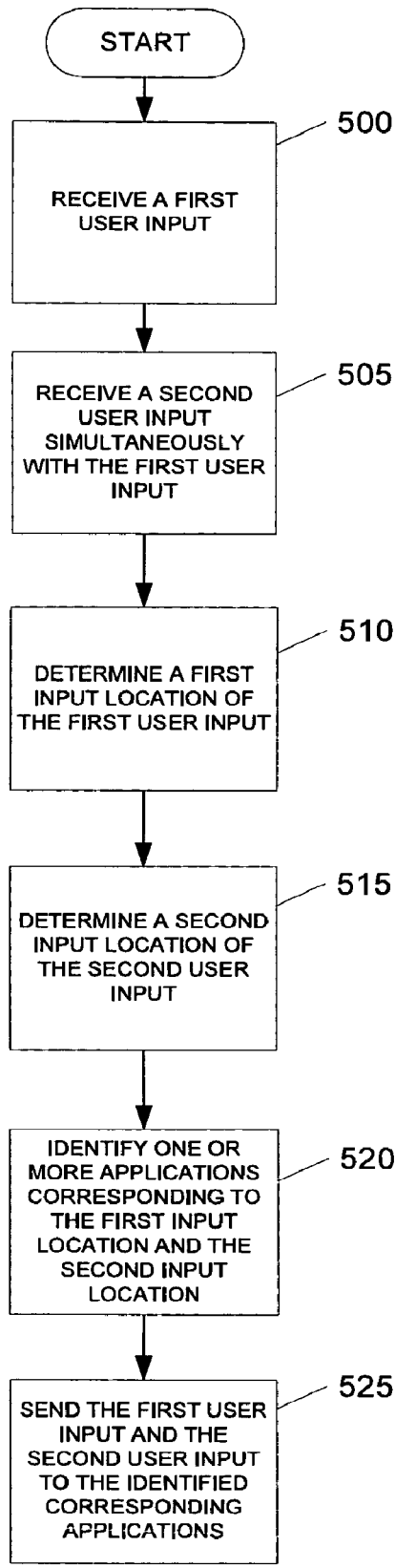
FIG. 5 is a flowchart illustrating a method for handling multiple simultaneous user inputs for a plurality of different applications according to one or more aspects described herein.

FIG. 5 is a flowchart illustrating a method of handling multiple simultaneous inputs directed at multiple different applications. In step 500 and 505, a first user input and a second user input are received or detected simultaneously. The inputs may correspond to users touching different locations of a touch-sensitive display or, in another example, the inputs may be associated with detected contacts with different sections of a touch input device, such as a touchpad or touch screen. Upon receiving the simultaneous first and second inputs, input locations are determined for each of the first and second inputs in steps 510 and 515. In the example of the touch-sensitive display, the input location may correspond to the location of user contact, i.e., input location. The input location information is then processed in step 520 to determine one or more applications that correspond to the first and second user inputs. The determination may involve a further determination of locations and sizes for each of the applications displayed on the user interface. An application may then be identified for each user input based on matching the input location with the location and size of the application. The user inputs may correspond to different applications or the same applications, again, based on the locations of user input and of the applications. Once applications corresponding to each user input have been identified, each user input is sent to the identified corresponding application in step 525.

Figure 6:
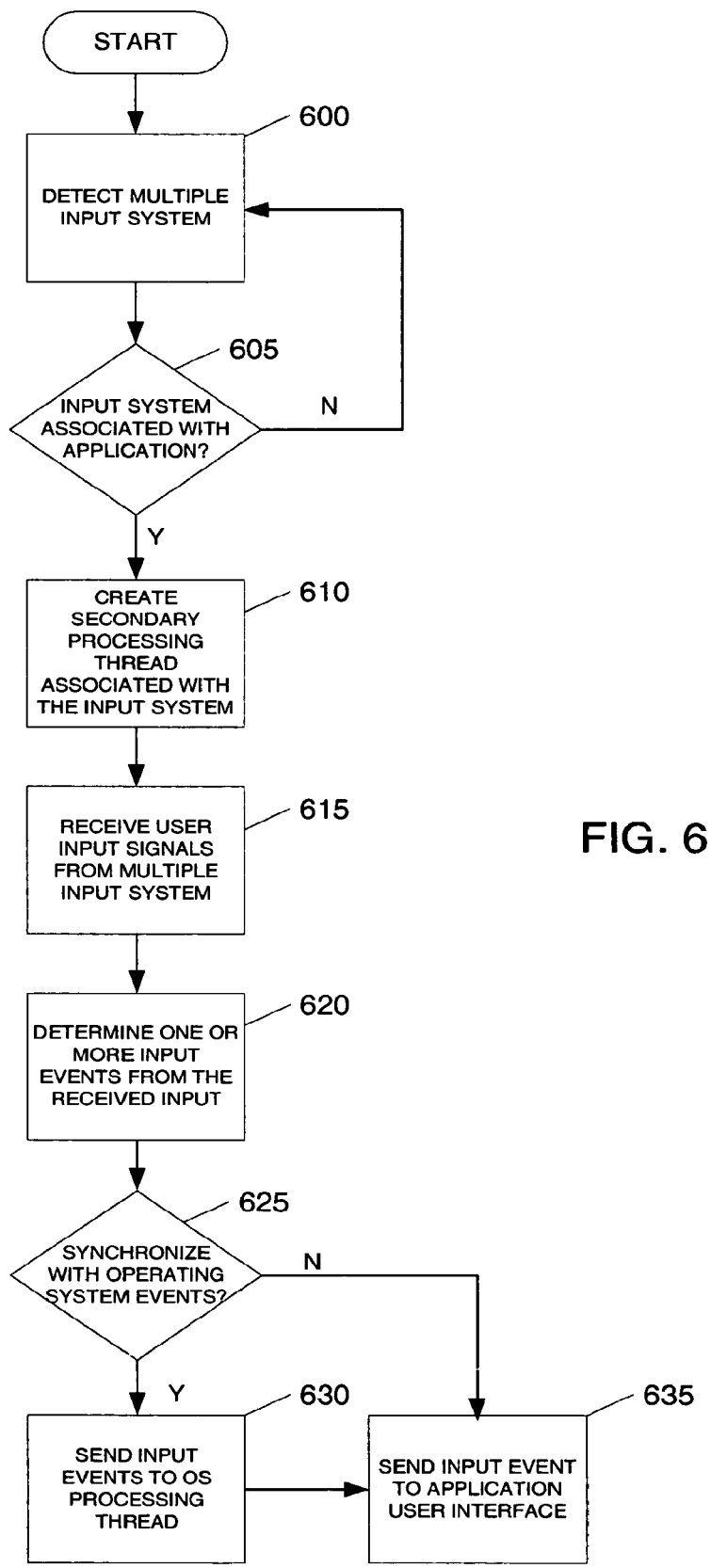
FIG. 6 is a flowchart illustrating a method for processing input from multiple input hardware systems according to one or more aspects described herein.

FIG. 6 is a flowchart showing a method for processing input from a multiple input system across at least two applications. In step 600, a multiple input hardware system or device is detected by an application. In one or more aspects, for example, a hardware connection may be detected by an underlying operating system and broadcast to applications. Any one of numerous detection methods known in the art may be used or implemented in conjunction with this step. In step 605, a determination is made to evaluate whether the detected input system is associated with the application. The input system may be associated with an application by, e.g., altering control settings and associations in the operating system. If the input system is not associated with the application, the application does not process input signals from the detected system. However, if the input system is associated with the application, then a secondary processing thread corresponding to the input system is created in step 610. The secondary processing thread is also created to run in parallel with an event processing thread of the operating system. Alternatively, the secondary processing thread may be created when the application is initialized.

Following the creation of the secondary processing thread, user input signals are received from the multiple input hardware system at the secondary processing thread in step 615. In step 620, the secondary thread processes the user input to determine one or more input events. In other words, the secondary thread identifies an action corresponding to the user input that is to be performed on the application user interface. For example, input signals from a touch sensitive display screen may reflect a change in position of a user's finger or stylus. As such, the change in a user's finger or stylus position may be determined by the secondary processing thread upon receiving the corresponding input signals. Input signals may further include multiple events such as selection and movement events corresponding to a select-and-drag interaction by the user with an element of the user interface. In step 625, another determination is made to decide whether the determined input event or events should be synchronized with one or more events of the operating system event processing thread. In one or more configurations, various user interface components such as user interface controls might be designed for access through OS Event processing threads. As such, input from a multiple input device directed toward such interface components may be synchronized with input events in the OS Event processing thread to properly register the input. In some instances, the application receiving the multiple input events may be responsible for determining whether the events need to be synchronized.

If the input events determined by the secondary processing thread are to be synchronized with the events of the OS Event processing thread, the input events of the secondary thread are sent to the OS Event thread in step 630. The OS thread may then synchronize, e.g., arrange the events in order of time received, and perform further processing before sending the events to the application UI in step 635. Alternatively, if the input events of the secondary thread do not need to be synchronized, the events are sent to the application user interface, as in step 635, without initially passing through the OS Event thread. One of skill in the art will appreciate that there are myriad of methods for synchronizing input events and any of those methods may be implemented with the systems and methods described herein.

Figure 7:
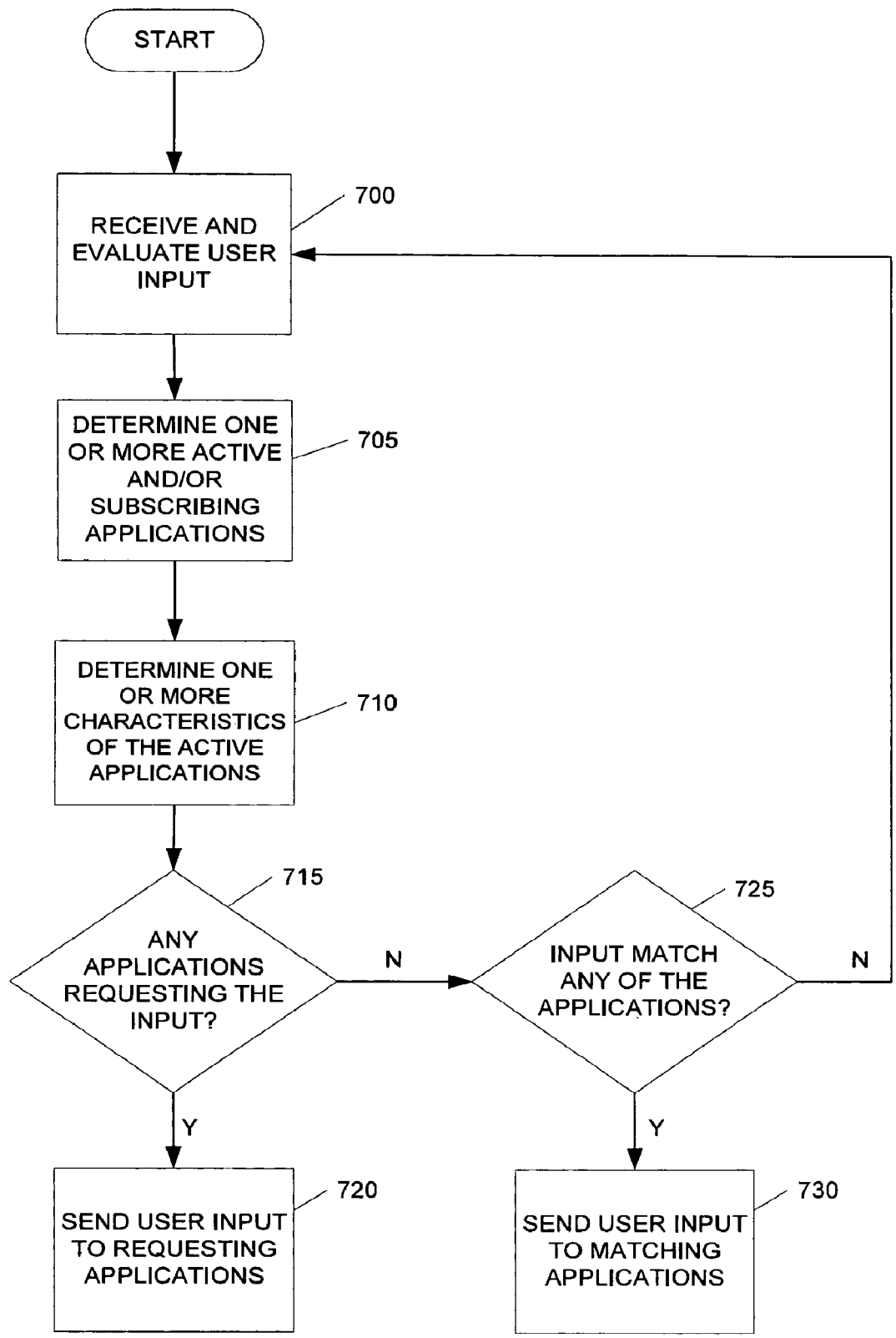
FIG. 7 is a flowchart illustrating a method for routing input signals and events according to one or more aspects described herein.

FIG. 7 is a flowchart illustrating a method of routing input signals and/or input events. Upon receiving user input in step 700, the user input is evaluated to determine various characteristics of the input. These characteristics may include a type of input, duration of input, input location, identification of the input source and the like. In step 705, applications active on the user interface and/or subscribing to input from the input source are identified. For example, in one or more configurations, the user interface or underlying operating system may maintain a database of applications that subscribe to particular input devices or systems. In step 710, characteristics of the identified applications are determined. Application characteristics may include application type (e.g., game, tool, word processing, etc.), application location and application control and input type. Once the relevant applications have been identified and any characteristics have been determined from the applications and input, a determination is then made in step 715 to identify any applications that subscribe to or are requesting the received input. Thus, an electronic video game, for example, may be identified as an application that subscribes to input from a particular joystick connected to the computing device. In response to determining that one or more applications subscribe to or requested the input, the received input is sent to the one or more applications in step 720. If, however, no applications subscribe or request the input, another determination may be made, in step 725, to evaluate whether the determined input characteristics matches any of the characteristics of the identified applications. In one example, a user input location may be determined to match a location of a user interface corresponding to a particular application. In such an instance, the user input may be sent automatically to the particular application, in step 730, even if the application did not request or subscribe to the user input. Alternatively or additionally, the application is free to use or reject the received user input based on a separate determination. Further, input may be sent to all applications regardless of whether matches are determined in steps 720 or 725. Referring to the previous dice rolling example, dice input may be sent to all applications regardless of subscriptions or matches.

The methods and systems described herein have been discussed, in large part, with respect to a multiple application system. However, the methods and systems may further be implemented and applied to single application systems have multiple components. Individual secondary threads may be created for each of the multiple components to handle user input from a multiple input hardware system. Additionally, a single user input device may also be used to interact with a single or multiple application system. In one or more configurations, the single user input device may comprise a touch-sensitive screen upon which one or more applications are displayed. By determining a location of touch, users may interact with multiple applications simultaneously by correlating the location of touch with an application or a component thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. In a computing environment, the computing environment comprising a multiple input capable hardware system including a device capable of detecting and transmitting multiple simultaneous user inputs at the same time, a method for processing different inputs across multiple components of one or more applications displayed on a single display of a user interface, the method comprising:
   receiving a first user input from a multiple input capable hardware device having a touch-sensitive display;
   simultaneous to receiving the first user input from the multiple input capable hardware device, receiving a second user input from the multiple input capable hardware device, both of the first and second user input being entered at and detected by the touch-sensitive display at substantially the same time;
   determining that the first user input corresponds to a first component instance;
   routing the first user input to a first input event processing thread associated with a first component instance;
   determining a first user input event from the first user input;
   rendering the determined first user input event on a user interface of the first component instance;
   determining that the second user input corresponds to a separate second component instance;
   routing the second user input to a separate second input event processing thread associated with the second component instance;
   determining a second user input event from the second user input; and
   rendering the determined second user input event on a user interface of the second component instance, wherein the first input event processing thread runs in parallel to a first main operating system event processing thread of the first component instance and wherein the second input event processing thread runs in parallel to a second main operating system event processing thread.

2. The method of claim 1, wherein determining that the first user input corresponds to the first component instance comprises determining that the first user input was input at a first input location and wherein determining that the second user input corresponds to a second component instance comprises determining that the second user input was input as a different second input location.

3. The method of claim 1, wherein determining that the first user input corresponds to the first component instance comprises determining the location and size of the first component instance and wherein determining that the second user input corresponds to a second component instance comprises determining the size and location of the second component instance.

4. The method of claim 1, wherein determining that the first user input corresponds to the first component instance and determining that the second user input corresponds to a second component instance comprises determining the type of user input.

5. The method of claim 4, wherein the multiple input capable hardware device comprises a touch screen, and wherein determining the type of user input comprises determining that the first user input is from a finger and the second user input is from a stylus.

6. The method of claim 1, further comprising synchronizing the first and second component instances, by sending the first user input to the second component instance and the second user input to the first component instance.

7. The method of claim 1, further comprising synchronizing the first and second component instances, by sending the first user input and the second user input to a third synchronization component instance.

8. The method of claim 1, further comprising transmitting the first user input and the second user input to a computing device in a single transmission frame.

9. In a computing environment, the computing environment comprising a multiple input capable hardware system including a device capable of detecting and transmitting multiple simultaneous user inputs at the same time, a computer readable storage medium comprising computer executable instructions that when executed by one or more processors perform the following acts to process different inputs across multiple components of one or more applications displayed on a single display of a user interface:
   receiving a first user input from a multiple input capable hardware device having a touch-sensitive display;
   simultaneous to receiving the first user input from the multiple input capable hardware device, receiving a different second user input from the multiple input capable hardware device, both of the first and second user input being entered at and detected by the touch-sensitive display at substantially the same time;
   determining that the first user input corresponds to a first component instance;
   routing the first user input to a first input event processing thread associated with a first component instance;
   determining a first user input event from the first user input;

rendering the determined first user input event on a user interface of the first component instance;

determining that the second user input corresponds to a separate second component instance;

routing the second user input to a separate second input event processing thread associated with the second component instance, wherein the second input event processing thread runs in parallel to a second main operating system event processing thread of the second component instance;

determining a second user input event from the second user input; and rendering the determined second user input event on a user interface of the second component instance, wherein the first input event processing thread runs in parallel to a first main operating system event processing thread of the first component instance.

10. The computer readable medium of claim 9, wherein determining that the first user input corresponds to the first component instance comprises determining that the first user input was input at a first input location and wherein determining that the second user input corresponds to a second component instance comprises determining that the second user input was input as a different second input location.

11. The computer readable medium of claim 9, wherein determining that the first user input corresponds to the first component instance comprises determining the location and size of the first component instance and wherein determining that the second user input corresponds to a second component instance comprises determining the size and location of the second component instance.

12. The computer readable medium of claim 9, wherein determining that the first user input corresponds to the first component instance and determining that the second user input corresponds to a second component instance comprises determining the type of user input.

13. The computer readable medium of claim 12, wherein the multiple input capable hardware device comprises a touch screen, and wherein determining the type of user input comprises determining that the first user input is from a finger and the second user input is from a stylus.

14. The computer readable medium of claim 9, further comprising computer executable instructions that when executed by one or more processors perform synchronizing the first and second component instances, by sending the first user input to the second component instance and the second user input to the first component instance.

15. The computer readable medium of claim 9, further comprising computer executable instructions that when executed by one or more processors perform synchronizing the first and second component instances, by sending the first user input and the second user input to a third synchronization component instance.

16. The computer readable medium of claim 9, further comprising computer executable instructions that when executed by one or more processors perform the transmitting the first user input and the second user input to a computing device in a single transmission frame.

17. In a computing environment, the computing environment comprising a multiple input capable hardware system including a device capable of detecting and transmitting multiple simultaneous user inputs at the same time, a computer system comprising one or more processors and computer memory, the computer memory comprising computer executable instructions that when executed by the one or more processors perform the following acts to process different inputs across multiple components of one or more applications displayed on a single display of a user interface:

receiving a first user input from a multiple input capable hardware device having a touch-sensitive display;

simultaneous to receiving the first user input from the multiple input capable hardware device, receiving a different second user input from the multiple input capable hardware device, both of the first and second user input being entered at and detected by the touch-sensitive display at substantially the same time;

determining that the first user input corresponds to a first component instance;

routing the first user input to a first input event processing thread associated with a first component instance;

determining a first user input event from the first user input;

rendering the determined first user input event on a user interface of the first component instance;

determining that the second user input corresponds to a separate second component instance;

routing the second user input to a separate second input event processing thread associated with the second component instance;

determining a second user input event from the second user input; and rendering the determined second user input event on a user interface of the second component instance, wherein the first input event processing thread runs in parallel to a first main operating system event processing thread of the first component instance and wherein the second input event processing thread runs in parallel to a second main operating system event processing thread.

18. The computer system of claim 17, wherein determining that the first user input corresponds to the first component instance comprises determining that the first user input was input at a first input location and wherein determining that the second user input corresponds to a second component instance comprises determining that the second user input was input as a different second input location.

19. The computer system of claim 17, wherein determining that the first user input corresponds to the first component instance comprises determining the location and size of the first component instance and wherein determining that the second user input corresponds to a second component instance comprises determining the size and location of the second component instance.

20. The computer system of claim 17, wherein determining that the first user input corresponds to the first component instance and determining that the second user input corresponds to a second component instance comprises determining the type of user input.

* * * * *